United States Patent Office.

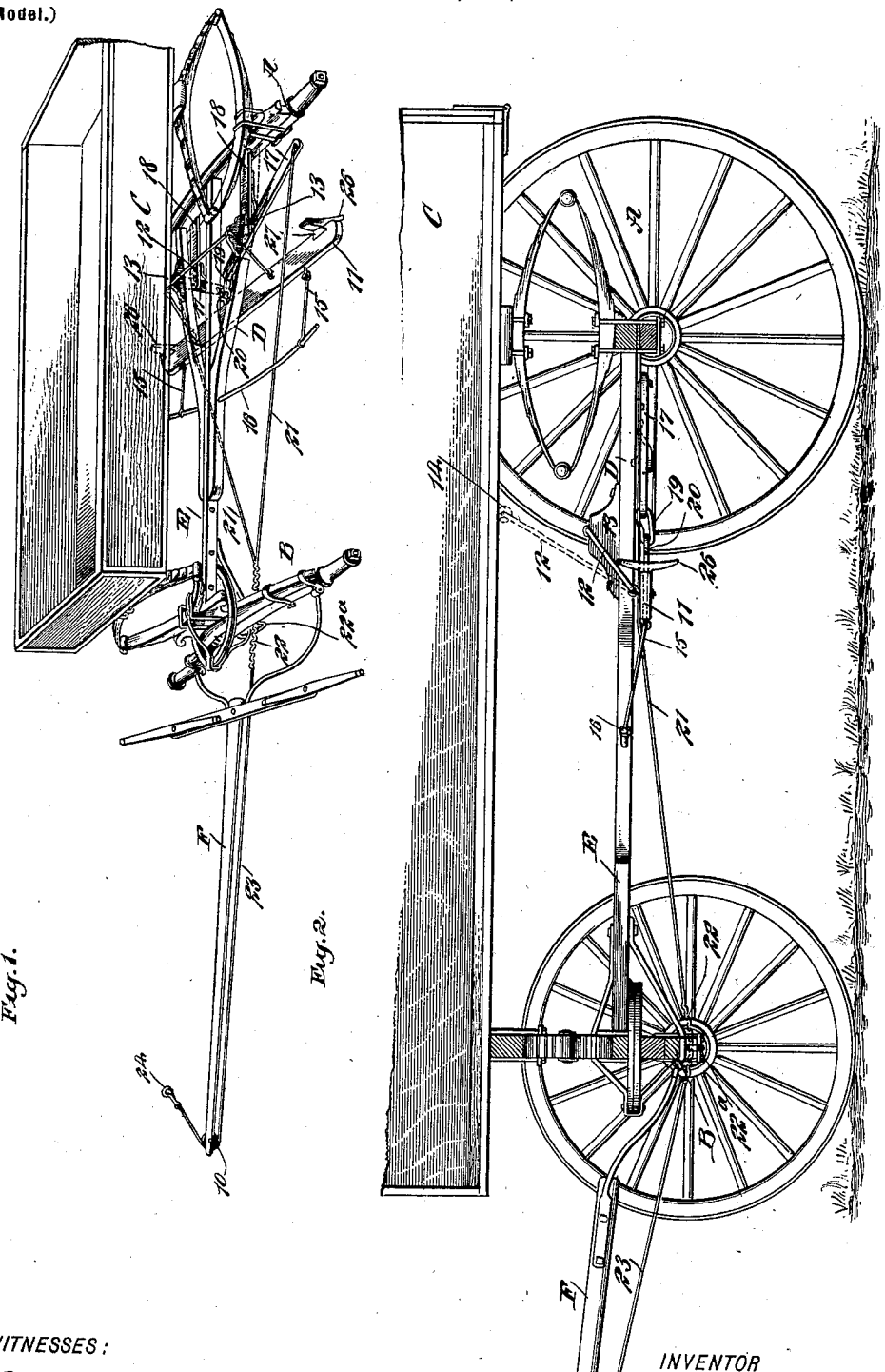

HUGH MAGEE, OF MEADVILLE, MISSISSIPPI.

VEHICLE-BRAKE.

SPECIFICATION forming part of Letters Patent No. 660,914, dated October 30, 1900.

Application filed March 29, 1900. Serial No. 10,629. (No model.)

*To all whom it may concern:*

Be it known that I, HUGH MAGEE, a citizen of the United States, and a resident of Meadville, in the county of Franklin and State of Mississippi, have invented a new and useful Improvement in Vehicle-Brakes, of which the following is a full, clear, and exact description.

The purpose of this invention is to construct a brake for vehicles which will be out of engagement with the wheels when the vehicle is being drawn ahead, but which brake will be immediately placed in position to check the motion of the vehicle the moment the animal or animals are caused to move rearward or are quickly checked, the action of the brake being automatic to that extent that it is under the control of the draft-animals of the vehicle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of a vehicle, illustrating the improvement applied thereto; and Fig. 2 is a side elevation of the vehicle, the axles being in transverse section.

A represents the rear axle of a vehicle, and B the forward axle, and these axles are connected with the body C of the vehicle in any suitable or approved manner.

D represents the rear hounds, E the reach, and F the pole, which is shown connected with the forward axle, which pole F is provided with a pulley 10 at its forward end, adapted for a purpose to be hereinafter described.

The brake-beam 11 extends, as usual, from side to side of the running-gear and faces the rear wheels of the vehicle. This brake-beam 11 is supported by a yoke 12, pivotally connected with the brake-beam and usually pivotally mounted upon blocks 13, secured upon the hounds D, although, as shown in dotted lines in Fig. 2, the yoke 12 may be pivotally attached by screw-eyes 14 or their equivalents to the bottom of the body C. This yoke 12 in its normal position or when the brake is off the wheels has a decided downward and forward inclination, as shown in both the views. The brake-beam 11 is held normally out of engagement with the rear wheels of the vehicle through the medium of a spring 16, which is preferably a bar-spring, and is passed through or secured above the forward portion of the hounds and the reach, extending beyond opposite sides of the former, and the ends of this spring are connected by links 15 or their equivalents with the forward edge of the brake-beam 11 at each side of the center of the said beam.

Two levers 17 are pivoted between their ends on projections 18, extending forward from the rear axle, and the inner ends of these levers are made to approach each other. The said inner ends of the levers 17 are provided with links 19, which links engage with an eye 20 or its equivalent, secured to the central portion of the rear longitudinal edge of the brake-beam 11. The ends of a rod, rope, or chain 21 are secured to the outer or free ends of the levers 17, and this rope, chain, or rod 21 is carried in direction of the forward axle B and is connected by a section 22, which passes through a guide 22ª, attached to the forward axle, with a forward rope, chain, or rod 23, which passes beneath the tongue or pole F and over the pulley 10, and this forward rope, chain, or rod 23 is provided with a hook 24 or equivalent means for attachment to the neck-yoke of a harness or to any other holdback portion thereof. The brake-shoes 26 are provided with dovetailed shanks 27, and these dovetailed shanks are made to enter correspondingly-shaped grooves in the rear edge of the brake-beam 11.

In operation when the vehicle is drawn forward the brake-shoes of the brake-beam are out of engagement with the rear wheels, being held in such position by the spring 16; but the moment that the team is suddenly checked or backed the rope, chain, or rod 23 is drawn forward, and consequently through the medium of the rear rope, rod, or chain 21 the outer ends of the levers 17 are carried in the same direction, thus causing the inner ends of the levers 17 to draw the brake-beams in a rearward direction through the connections 19 and 20, and thus bring the brake-shoes in firm contact with the rear wheels of the vehicle.

Having thus described my invention, I claim as new and desire to secure by Letters Patent—

1. The brake herein described comprising the reach and hounds, the yoke pivotally supported at its upper end above the reach and hounds and having at its ends depending arms extending past the reach and hounds, the brake-bar supported on said arms, and arranged below the reach and hounds, the spring-bar secured at its middle to the running-gear in advance of the brake-bar and having its outer free ends connected with the brake-bar whereby to actuate the same forward at both ends, the levers arranged in rear of the brake-bar and below the hounds and pivoted to the latter, connections between the inner ends of said levers and the brake-bar and means for operating the levers to set the brake, substantially as set forth.

2. In a brake substantially as described, the combination of the brake-bar, means supporting the same, devices for operating the bar to set the brake and a spring-bar secured at its middle in advance of the brake-bar and connected at its ends with the brake-bar whereby to advance the same, substantially as set forth.

3. The combination of the reach and hounds, the blocks mounted on the hounds, the yoke having a cross-bar journaled in said blocks and provided at its ends with depending arms, the brake-bar supported on said arms, means for operating the brake-bar to set the brake, and a spring for releasing the brake, substantially as set forth.

4. In a brake the combination of the reach and hounds, the yoke pivotally supported above the hounds and having at its ends depending arms extending past the hounds, the brake-bar supported on said arms and arranged below the hounds, a spring for releasing the brake, and levers arranged below and pivoted to the hounds, means connecting the inner ends of the levers with the brake-bar, and means for operating the levers to set the brake, substantially as set forth.

In testimony whereof I have signed my name to this specification in the presence of two subscribing witnesses.

HUGH MAGEE.

Witnesses:
J. F. HOLLINGER,
W. M. DUNN.